US009379394B2

(12) United States Patent
Fischer et al.

(10) Patent No.: US 9,379,394 B2
(45) Date of Patent: Jun. 28, 2016

(54) HEATER WITH A FUEL CELL STACK ASSEMBLY AND A COMBUSTOR AND METHOD OF OPERATING

(71) Applicant: DELPHI TECHNOLOGIES, INC., Troy, MI (US)

(72) Inventors: Bernhard A. Fischer, Honeoye Falls, NY (US); James D. Richards, Spencerport, NY (US)

(73) Assignee: Delphi Technologies, Inc., Troy, MI (US)

( * ) Notice: Subject to any disclaimer, the term of this patent is extended or adjusted under 35 U.S.C. 154(b) by 118 days.

(21) Appl. No.: 14/081,092

(22) Filed: Nov. 15, 2013

(65) Prior Publication Data

US 2015/0140463 A1   May 21, 2015

(51) Int. Cl.
| | |
|---|---|
| *H01M 8/04* | (2006.01) |
| *H01M 8/24* | (2016.01) |
| *E21B 36/00* | (2006.01) |
| *E21B 36/02* | (2006.01) |

(52) U.S. Cl.
CPC ......... *H01M 8/04022* (2013.01); *E21B 36/008* (2013.01); *E21B 36/02* (2013.01); *H01M 8/2475* (2013.01); *H01M 2250/10* (2013.01); *H01M 2250/405* (2013.01); *Y02B 90/14* (2013.01); *Y02B 90/16* (2013.01); *Y02E 60/50* (2013.01)

(58) Field of Classification Search
None
See application file for complete search history.

(56) References Cited

U.S. PATENT DOCUMENTS

| | | | | |
|---|---|---|---|---|
| 6,033,793 | A  * | 3/2000 | Woods | F23D 11/443 123/169 EA |
| 6,684,948 | B1 | 2/2004 | Savage | |
| 6,720,099 | B1 | 4/2004 | Haltiner, Jr. | |
| 7,182,132 | B2 | 2/2007 | Savage | |
| 7,713,056 | B2 | 5/2010 | Hamada et al. | |
| 2001/0049039 | A1 | 12/2001 | Haltiner, Jr. | |
| 2004/0200605 | A1* | 10/2004 | Yoshida et al. | 165/142 |
| 2004/0229096 | A1 | 11/2004 | Standke et al. | |
| 2006/0147771 | A1* | 7/2006 | Russell et al. | 429/24 |
| 2007/0048685 | A1 | 3/2007 | Kuenzler et al. | |
| 2007/0148513 | A1 | 6/2007 | Pastula et al. | |
| 2010/0163226 | A1 | 7/2010 | Zornes | |
| 2012/0094201 | A1 | 4/2012 | Haltiner, Jr. et al. | |

OTHER PUBLICATIONS

PCT/US2014/065647 International Search Report Dated Feb. 24, 2015.
"Phase 1 Report, Geothermic Fuel Cell In-Situ Applications for Recovery of Unconventional Hydrocarbons"; Independent Energy Partners; Title: Geothermic Fuel Cells: Phase 1 Report.

* cited by examiner

*Primary Examiner* — Sarah A Slifka
*Assistant Examiner* — Haroon S Sheikh
(74) *Attorney, Agent, or Firm* — Joshua M. Haines

(57) ABSTRACT

A heater includes a heater housing extending along a heater axis. A fuel cell stack assembly is disposed within the heater housing and includes a plurality of fuel cells which convert chemical energy from a fuel cell fuel into heat and electricity through a chemical reaction with a fuel cell oxidizing agent. A combustor disposed within the heater housing includes a combustor fuel inlet for introducing the combustor fuel into the combustor, a combustor oxidizing agent inlet for introducing a combustor oxidizing agent into the combustor, and combustor exhaust outlet for discharging a heated combustor exhaust from the combustor. An anode exhaust conduit is connected to the anode exhaust outlet and extends out of the heater housing for selectively communicating a first quantity of the anode exhaust out of the heater housing. The heater housing is heated by the fuel cell stack assembly and the heated combustor exhaust.

19 Claims, 5 Drawing Sheets

HEATER WITH A FUEL CELL STACK ASSEMBLY AND A COMBUSTOR AND METHOD OF OPERATING

TECHNICAL FIELD OF INVENTION

The present invention relates to a heater which uses fuel cell stack assemblies as a source of heat; more particularly to such a heater which is positioned within a bore hole of an oil containing geological formation in order to liberate oil therefrom; even more particularly to such a heater which includes a combustor for combusting a mixture of fuel and air, thereby functioning as an additional source of heat; and still even more particularly to an arrangement for supplying fuel to the combustor.

BACKGROUND OF INVENTION

Subterranean heaters have been used to heat subterranean geological formations in oil production, remediation of contaminated soils, accelerating digestion of landfills, thawing of permafrost, gasification of coal, as well as other uses. Some examples of subterranean heater arrangements include placing and operating electrical resistance heaters, microwave electrodes, gas-fired heaters or catalytic heaters in a bore hole of the formation to be heated. Other examples of subterranean heater arrangements include circulating hot gases or liquids through the formation to be heated, whereby the hot gases or liquids have been heated by a burner located on the surface of the earth. While these examples may be effective for heating the subterranean geological formation, they may be energy intensive to operate.

U.S. Pat. Nos. 6,684,948 and 7,182,132 propose subterranean heaters which use fuel cells as a more energy efficient source of heat. The fuel cells are disposed in a heater housing which is positioned within the bore hole of the formation to be heated. The fuel cells convert chemical energy from a fuel into heat and electricity through a chemical reaction with an oxidizing agent. U.S. Pat. Nos. 6,684,948 and 7,182,132 illustrate strings of fuel cells that may be several hundred feet in length. Operation of the fuel cells requires fuel and air to be supplied to each of the fuel cells and spent fuel (anode exhaust) and spent air (cathode exhaust) must be exhausted from each of the fuel cells. In order to do this, a fuel supply conduit and an air supply conduit are provided such that each extends the entire length of the string of fuel cells to supply fuel and air to each of the fuel cells. Similarly, an anode exhaust conduit and a cathode exhaust conduit are provided such that each extends the entire length of the string of fuel cells to expel anode exhaust and cathode exhaust from each of the fuel cells to the surface (e.g., the top of the bore hole of the formation).

U.S. patent application Ser. No. 14/013,708 to Fischer et al., the disclosure of which is incorporated herein by reference in its entirety, teaches a subterranean heater which uses fuel cells and combustors to heat a geological formation. The fuel cells and combustors are disposed in a heater housing in an alternating pattern and are operated to heat the heater housing, and consequently the geological formation. However, the fuel cells cannot utilize all of the hydrogen present in the reformate that is supplied as a fuel to the anode of the fuel cell because a typical safe fuel utilization range is between about 40% and about 60%. Higher fuel utilization may lead to decreased durability of the fuel cells, consequently, there is a significant amount of hydrogen remaining in the anode exhaust. Similarly, there is oxygen remaining in the cathode exhaust. In order to utilize the remaining hydrogen from the anode exhaust and the remaining oxygen from the cathode exhaust, the combustors are supplied with anode exhaust and cathode exhaust from the fuel cells. The anode exhaust and the cathode exhaust are mixed within the combustor and the mixture is combusted to produce a heated combustor exhaust which is discharged into the heater housing. While this arrangement may utilize more of the hydrogen in order to produce heat for heating the geological formation, the combustor fuel flow is dependent on the reformate flow to the fuel cells and consequently cannot be controlled independently of the fuel cells; however, it may be desirable to adjust the thermal output of the combustors independently of the fuel cells.

What is needed is a heater which minimizes or eliminates one of more of the shortcomings as set forth above.

SUMMARY OF THE INVENTION

A heater includes a heater housing extending along a heater axis. A fuel cell stack assembly is disposed within the heater housing and includes a plurality of fuel cells which convert chemical energy from a fuel cell fuel into heat and electricity through a chemical reaction with a fuel cell oxidizing agent. The fuel cell stack assembly includes a fuel cell fuel inlet for introducing the fuel cell fuel to a plurality of anodes of the plurality of fuel cells, a fuel cell oxidizing agent inlet for introducing the fuel cell oxidizing agent to a plurality of cathodes of the plurality of fuel cells, an anode exhaust outlet for discharging an anode exhaust comprising unspent fuel from the plurality of fuel cells, and a cathode exhaust outlet for discharging a cathode exhaust comprising unspent oxidizing agent from the plurality of fuel cells. A combustor is disposed within the heater housing for combusting a mixture of a combustor fuel and a combustor oxidizing agent to form a heated combustor exhaust. The combustor includes a combustor fuel inlet for introducing the combustor fuel into the combustor, a combustor oxidizing agent inlet for introducing the combustor oxidizing agent into the combustor, and a combustor exhaust outlet for discharging the heated combustor exhaust from the combustor into the heater housing. An anode exhaust conduit is connected to the anode exhaust outlet and extends out of the heater housing for selectively communicating a first quantity of the anode exhaust out of the heater housing. The heater housing is heated by the fuel cell stack assembly and the heated combustor exhaust. The anode exhaust conduit allows chemical energy remaining in the cathode exhaust to be utilized while making provisions for the combustor to operated independently of the fuel cell.

BRIEF DESCRIPTION OF DRAWINGS

This invention will be further described with reference to the accompanying drawings in which.

DETAILED DESCRIPTION OF INVENTION

Figure 1:
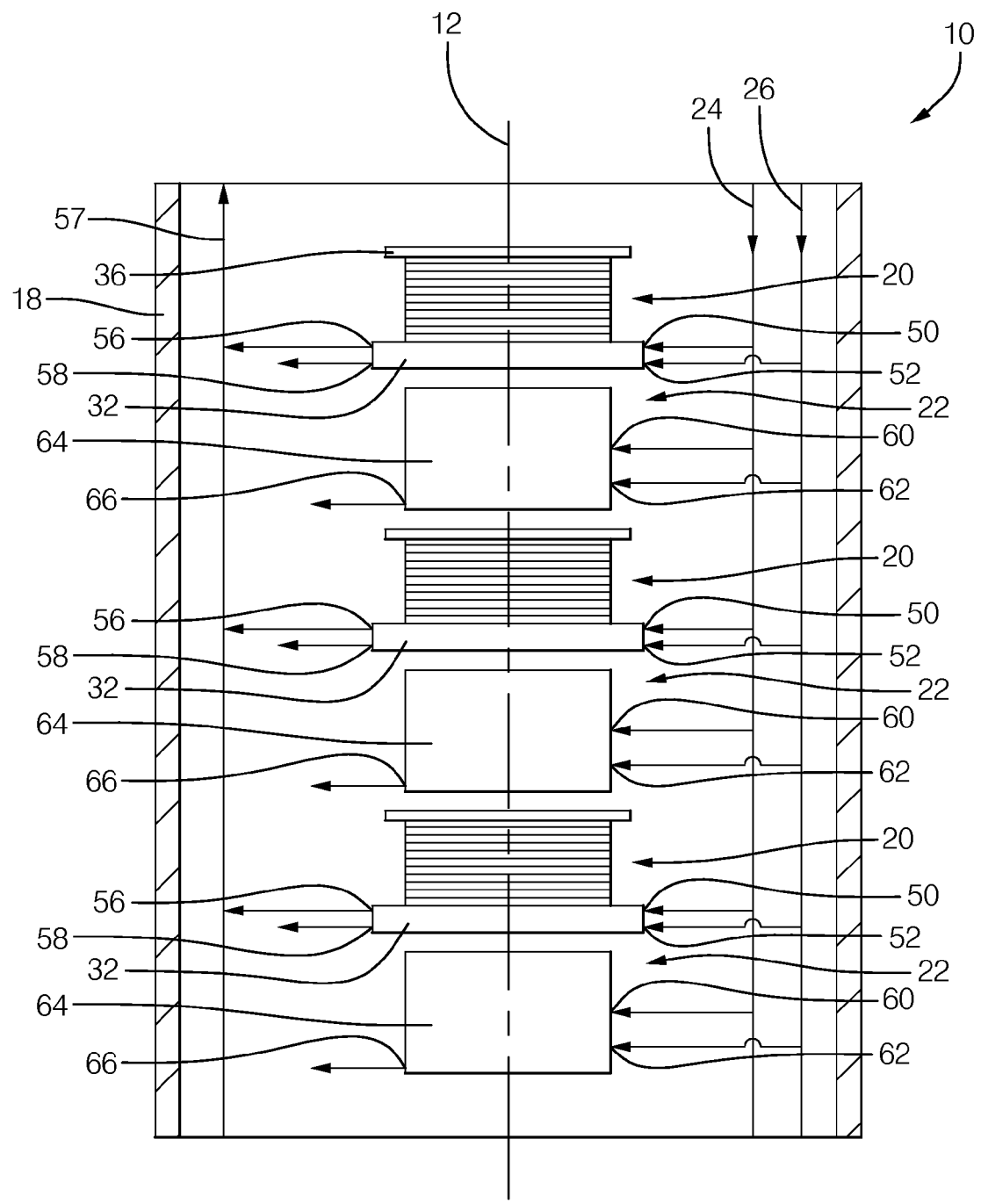
FIG. 1 is a schematic of a heater in accordance with the present invention.
Figure 2:
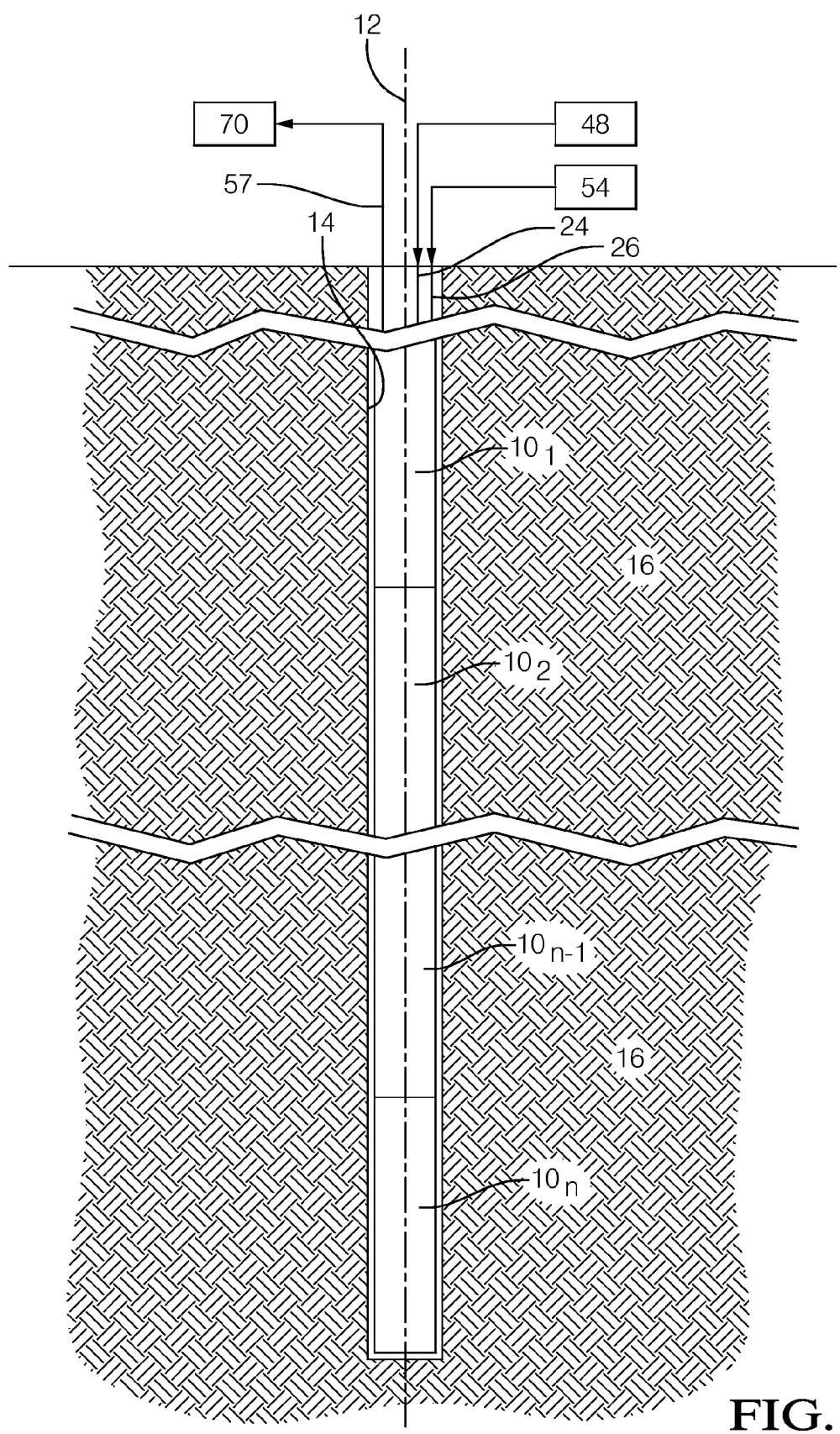
FIG. 2 is a schematic of a plurality of heaters of FIG. 1 shown in a bore hole of a geological formation.

Referring now to FIGS. 1 and 2, a heater 10 extending along a heater axis 12 is shown in accordance with the present invention. A plurality of heaters $10_1, 10_2, \ldots 10_{n-1}, 10_n$, where n is the total number of heaters 10, may be connected together end to end within a bore hole 14 of a formation 16, for example, an oil containing geological formation, as shown in FIG. 2. Bore hole 14 may be only a few feet deep; however, may typically be several hundred feet deep to in excess of one thousand feet deep. Consequently, the number of heaters 10 needed may range from 1 to several hundred. It should be noted that the oil containing geological formation may begin as deep as one thousand feet below the surface and consequently, heater $10_1$ may be located sufficiently deep within bore hole 14 to be positioned near the beginning of the oil containing geological formation. When this is the case, units without active heating components may be positioned from the surface to heater $10_1$ in order to provide plumbing, power leads, and instrumentation leads to support and supply fuel and air to heaters $10_1$ to $10_n$.

Heater 10 generally includes a heater housing 18 extending along heater axis 12, a plurality of fuel cell stack assemblies 20 located within heater housing 18 such that each fuel cell stack assembly 20 is spaced axially apart from each other fuel cell stack assembly 20, a plurality of combustors 22 located within heater housing 18 such that combustors 22 and fuel cell stack assemblies 20 are arranged in an alternating pattern, a fuel supply conduit 24 for supplying fuel to fuel cell stack assemblies 20 and combustors 22, and an oxidizing agent supply conduit 26; hereinafter referred to as air supply conduit 26; for supplying an oxidizing agent, for example air, to fuel cell stack assemblies 20 and combustors 22. While heater 10 is illustrated with three fuel cell stack assemblies 20 and three combustors 22 within heater housing 18, it should be understood that a lesser number or a greater number of fuel cell stack assemblies 20 and/or combustors 22 may be included. The number of fuel cell stack assemblies 20 within heater housing 18 may be determined, for example only, by one or more of the following considerations: the length of heater housing 18, the heat output capacity of each fuel cell stack assembly 20, the desired density of fuel cell stack assemblies 20 and/or combustors 22 (i.e. the number of fuel cell stack assemblies 20 and/or combustors 22 per unit of length), and the desired heat output of heater 10. The number of heaters 10 within bore hole 14 may be determined, for example only, by one or more of the following considerations: the depth of formation 16 which is desired to be heated, the location of oil within formation 16, and the length of each heater 10.

Heater housing 18 may be substantially cylindrical and hollow and may support fuel cell stack assemblies 20 and combustors 22 within heater housing 18. Heater housing 18 of heater $10_x$, where x is from 1 to n where n is the number of heaters 10 within bore hole 14, may support heaters $10_{x+1}$ to $10_n$ by heaters $10_{x+1}$ to $10_n$ hanging from heater $10_x$. Consequently, heater housing 18 may be made of a material that is substantially strong to accommodate the weight of fuel cell stack assemblies 20 and heaters $10_{x+1}$ to $10_n$. The material of heater housing 18 may also have properties to withstand the elevated temperatures, for example 600° C. to 900° C., as a result of the operation of fuel cell stack assemblies 20 and combustors 22. For example only, heater housing 18 may be made of a 300 series stainless steel with a wall thickness of $3/16$ of an inch.

Figure 3:
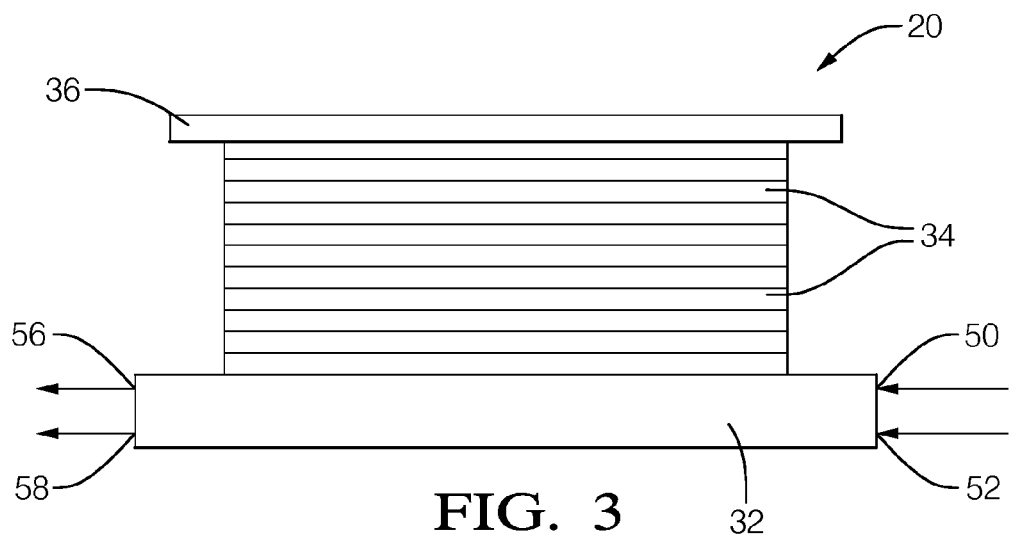
FIG. 3 is a schematic of a fuel cell stack assembly of the heater of FIG. 1.

With continued reference to FIGS. 1 and 2 and now with additional reference to FIG. 3, fuel cell stack assemblies 20 may be, for example only, solid oxide fuel cells which generally include a fuel cell manifold 32, a plurality of fuel cell cassettes 34 (for clarity, only select fuel cell cassettes 34 have been labeled), and a fuel cell end cap 36. Fuel cell cassettes 34 are stacked together between fuel cell manifold 32 and fuel cell end cap 36 in compression. Each fuel cell stack assembly 20 may include, for example only, 20 to 50 fuel cell cassettes 34.

Figure 4:
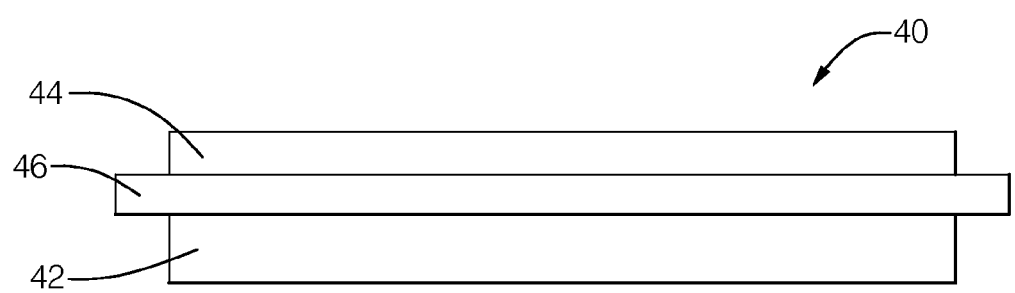
FIG. 4 is a schematic of a fuel cell of the fuel cell stack assembly of FIG. 3.

With continued reference to FIGS. 1-3 and now with additional reference to FIG. 4, each fuel cell cassette 34 includes a fuel cell 40 having an anode 42 and a cathode 44 separated by a ceramic electrolyte 46. Each fuel cell 40 converts chemical energy from a fuel cell fuel supplied to anode 42 into heat and electricity through a chemical reaction with air supplied to cathode 44. Further features of fuel cell cassettes 34 and fuel cells 40 are disclosed in United States Patent Application Publication No. US 2012/0094201 to Haltiner, Jr. et al., the disclosure of which is incorporated herein by reference in its entirety.

Now again with reference to FIGS. 1-2, fuel cell manifold 32 receives fuel, e.g. a hydrogen rich reformate which may be supplied from a fuel reformer 48, through a fuel cell fuel inlet 50 from fuel supply conduit 24 and distributes the fuel to each of the fuel cell cassettes 34. Fuel cell manifold 32 also receives an oxidizing agent, for example, air from an air supply 54, through a fuel cell air inlet 52 from air supply conduit 26. Fuel cell manifold 32 also receives anode exhaust, i.e. spent fuel and excess fuel from fuel cells 40 which may comprise $H_2$, CO, $H_2O$, $CO_2$, and $N_2$, and discharges the anode exhaust from fuel cell manifold 32 through an anode exhaust outlet 56 which is in fluid communication with an anode exhaust return conduit 57 as will be discussed in greater detail later. Fuel cell manifold 32 also receives cathode exhaust, i.e. spent air and excess air from fuel cells 40 which may comprise $O_2$ (depleted compared to the air supplied through air supply conduit 26) and $N_2$, and discharges the cathode exhaust from fuel cell manifold 32 through a cathode exhaust outlet 58 into heater housings 18.

Figure 5:
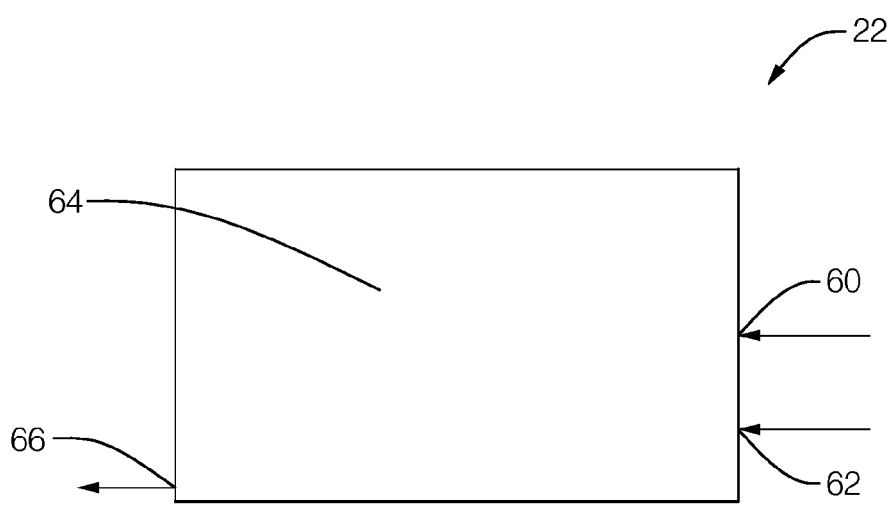
FIG. 5 is a schematic of a combustor of the heater of FIG. 1.

With continued reference to FIGS. 1 and 2 and now with additional reference to FIG. 5, each combustor 22 may include a combustor fuel inlet 60, a combustor oxidizing agent inlet 62, a combustion chamber 64, and a combustor exhaust outlet 66. Each combustor 22 may receive a combustor fuel through combustor fuel inlet 60. The combustor fuel is supplied to combustor 22 from fuel supply conduit 24 which also supplies the fuel cell fuel to fuel cell stack assemblies 20. Each combustor 22 may also receive a combustor oxidizing agent, for example air, through combustor oxidizing agent inlet 62. The combustor oxidizing agent is supplied to combustor 22 from air supply conduit 26 which also supplies the fuel cell oxidizing agent to fuel cell stack assemblies 20. The combustor fuel and the combustor oxidizing agent are mixed within combustion chamber 64 to form a combustible mixture which is combusted to form a heated combustor exhaust. The heated combustor exhaust is discharged from combustor 22 through combustor exhaust outlet 66 into heater housing 18.

Again with reference to FIGS. 1 and 2, in use, heaters $10_1, 10_2, \ldots 10_{n-1}, 10_n$ are operated by supplying fuel cell fuel and fuel cell air to fuel cell stack assemblies 20 which are located within heater housing 18. Fuel cell stack assemblies 20 carry out a chemical reaction between the fuel and air, causing fuel cell stack assemblies 20 to be elevated in temperature, for example, about 600° C. to about 900° C. Anode exhaust from fuel cell stack assemblies 20 is sent to anode exhaust return conduit 57 while cathode exhaust from fuel cell stack assemblies 20 is discharged into heater housing 18. Anode exhaust return conduit 57 communicates the anode exhaust out of heaters 10, e.g. out of bore hole 14, where the anode exhaust may be utilized by an anode exhaust utilization device 70 which may be used, for example only, to produce steam, drive compressors, or supply a fuel reformer. Combustor fuel and combustor air is supplied to combustors 22 where the combustor fuel and the combustor air is mixed and combusted to form a heated combustor exhaust which is discharged into heater housing 18. Consequently, fuel cell stack assemblies 20 together with the heated combustor exhaust elevate the temperature of heater housing 18 which subsequently elevates the temperature of formation 16.

Figure 6:
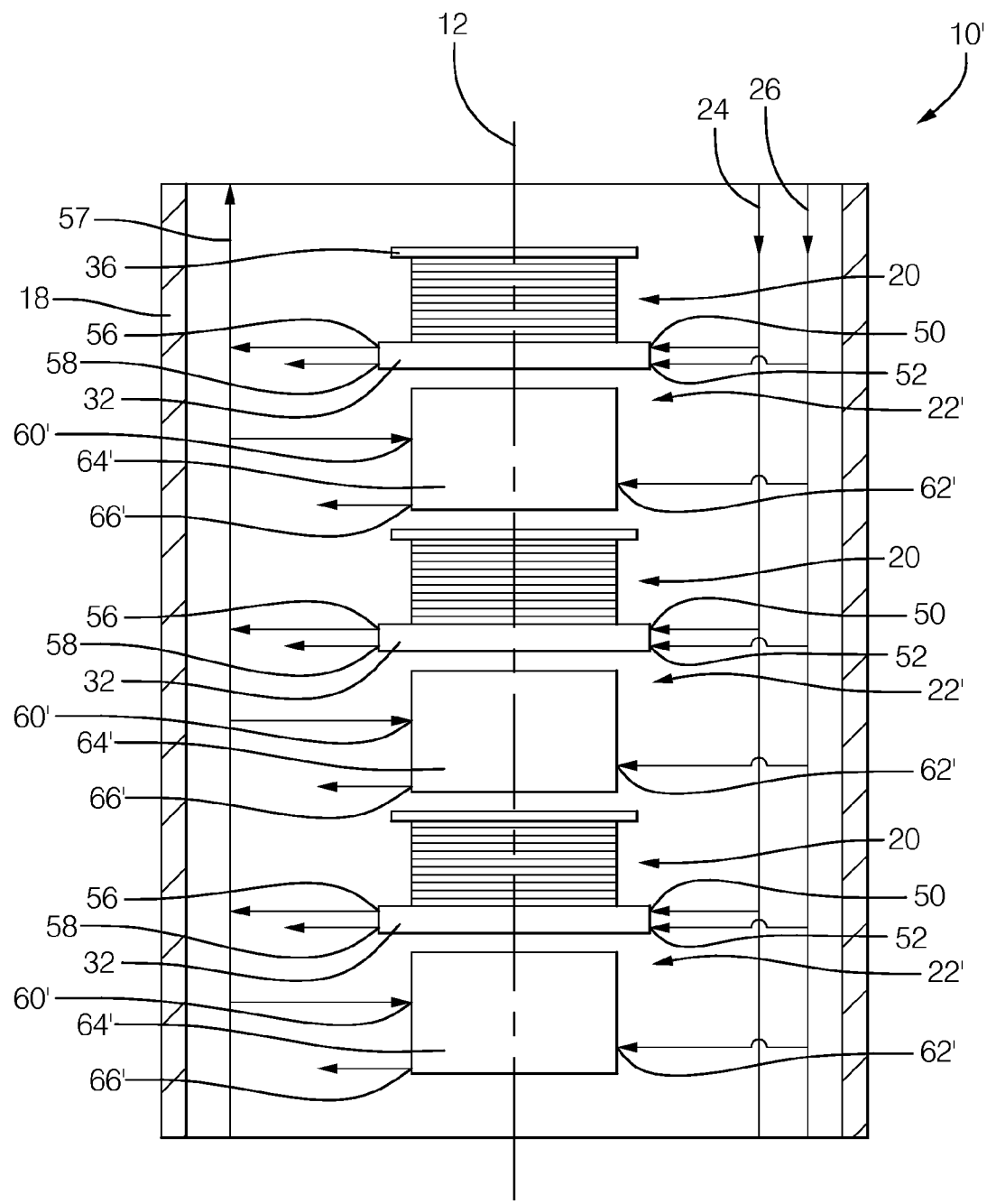
FIG. 6 is a schematic of an alternative heater in accordance with the present invention.
Figure 7:
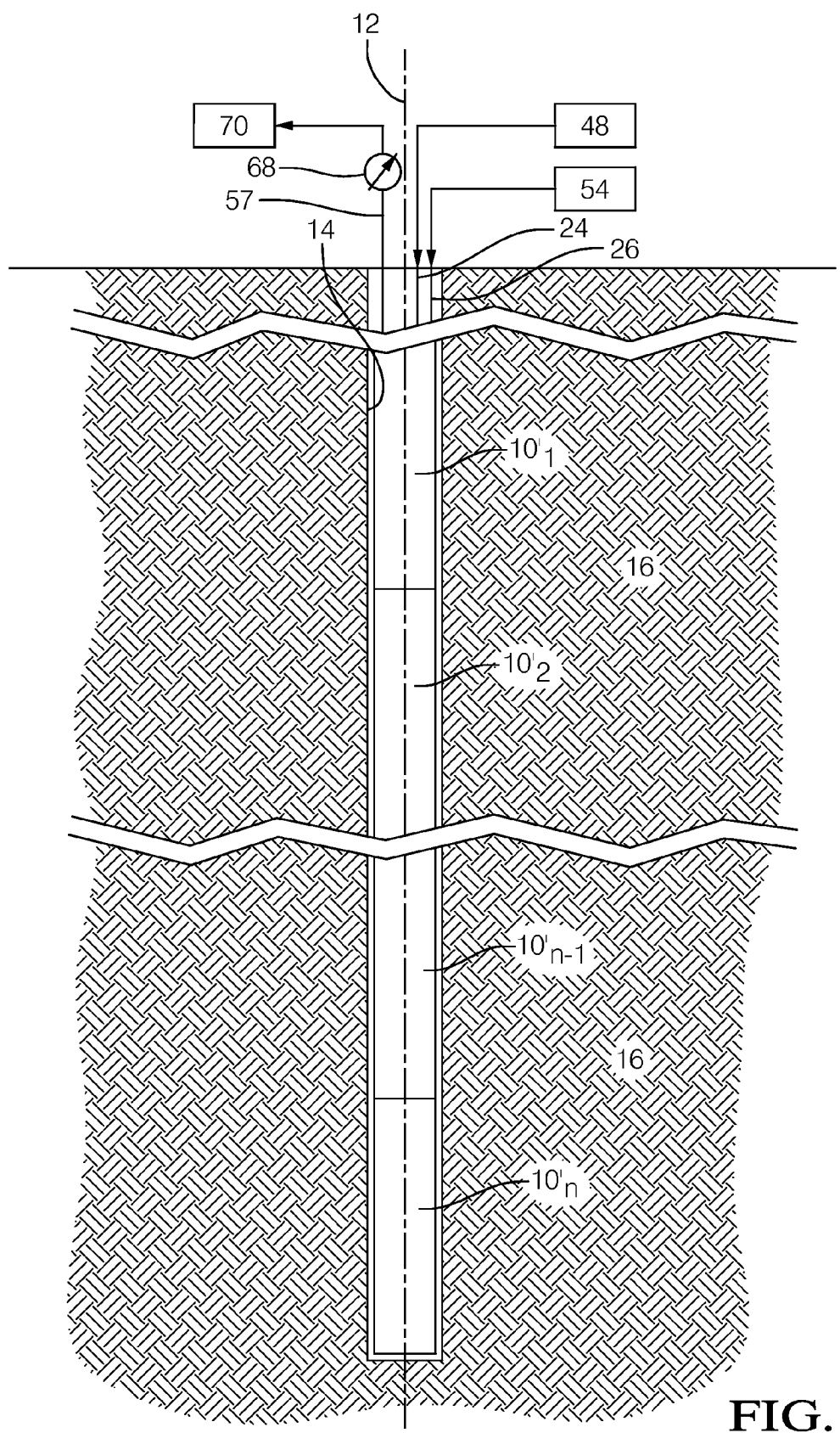
FIG. 7 is a schematic of a plurality of heaters of FIG. 4 shown in a bore hole of a geological formation.

Now with reference to FIGS. 6 and 7, an alternative heater 10' will be described. A plurality of heaters $10'_1, 10'_2, \ldots 10'_{n-1}, 10'_n$, where n is the total number of heaters 10', may be connected together end to end within a bore hole 14 of a formation 16, for example, an oil containing geological formation, as shown in FIG. 7. Heater 10' is substantially the same as heater 10 described above except that combustors 22 have been substituted with combustors 22'. Combustors 22' differ from combustors 22 as will be described in the following paragraphs.

Each combustor 22' may include a combustor fuel inlet 60', a combustor oxidizing agent inlet 62', a combustion chamber 64', and a combustor exhaust outlet 66'. Each combustor 22' may receive a combustor fuel through combustor fuel inlet 60'. The combustor fuel is supplied to combustor 22' from anode exhaust return conduit 57 which receives anode exhaust from fuel cell stack assemblies 20. Consequently, combustors 22' need not be connected to fuel supply conduit 24 as in heater 10 described above. Anode exhaust return conduit 57 may include a valve 68 which allows a first quantity of the anode exhaust out of heaters 10', i.e. out of bore hole 14 to the surface of formation 16, and a second quantity of the anode exhaust to combustors 22'. Valve 68 can be modulated, thereby adjusting the first quantity of the anode exhaust and the second quantity of anode exhaust and allowing for control of the thermal output of combustors 22' independently of the electrical output of fuel cell stack assemblies 20. The first quantity of anode exhaust that is communicated out of heaters 10' may be utilized by anode exhaust utilization device 70 which may be used, for example only, to produce steam, drive compressors, or supply a fuel reformer. Each combustor 22' may also receive a combustor oxidizing agent, for example air, through combustor oxidizing agent inlet 62'. The combustor oxidizing agent is supplied to combustor 22' from air supply conduit 26 which also supplies the fuel cell oxidizing agent to fuel cell stack assemblies 20. The combustor fuel and the combustor oxidizing agent are mixed within combustion chamber 64' to form a combustible mixture which is combusted to form a heated combustor exhaust. The heated combustor exhaust is discharged from combustor 22' through combustor exhaust outlet 66' into heater housing 18.

In use, heaters $10'_1, 10'_2, \ldots 10'_{n-1}, 10'_n$ are operated by supplying fuel cell fuel and fuel cell air to fuel cell stack assemblies 20 which are located within heater housing 18. Fuel cell stack assemblies 20 carry out a chemical reaction between the fuel and air, causing fuel cell stack assemblies 20 to be elevated in temperature, for example, about 600° C. to about 900° C. Anode exhaust from fuel cell stack assemblies 20 is sent to anode exhaust return conduit 57 while cathode exhaust from fuel cell stack assemblies 20 is discharged into heater housing 18. Anode exhaust return conduit 57 communicates the anode exhaust out of heaters 10, e.g. out of bore hole 14, where the anode exhaust may be utilized by an anode exhaust utilization device 70 which may be used, for example only, to produce steam, drive compressors, or supply a fuel reformer. Combustor fuel and combustor air is supplied to combustors 22' where the combustor fuel and the combustor air is mixed and combusted form a heated combustor exhaust which is discharged into heater housing 18. The combustor fuel is supplied to combustors 22' from anode exhaust return conduit 57. Consequently, fuel cell stack assemblies 20 together with the heated combustor exhaust elevate the temperature of heater housing 18 which subsequently elevates the temperature of formation 16.

While this invention has been described in terms of preferred embodiments thereof, it is not intended to be so limited, but rather only to the extent set forth in the claims that follow.

We claim:

1. A heater comprising:
   a heater housing extending along a heater axis;
   a fuel cell stack assembly disposed within said heater housing and having a plurality of fuel cells which convert chemical energy from a fuel cell fuel into heat and electricity through a chemical reaction with a fuel cell oxidizing agent, said fuel cell stack assembly having 1) a fuel cell stack fuel inlet for introducing said fuel cell fuel to a plurality of anodes of said plurality of fuel cells, 2) a fuel cell stack oxidizing agent inlet for introducing said fuel cell oxidizing agent to a plurality of cathodes of said plurality of fuel cells, 3) an anode exhaust outlet for discharging an anode exhaust comprising unspent fuel from said plurality of fuel cells, and 4) a cathode exhaust outlet for discharging a cathode exhaust comprising unspent fuel cell oxidizing agent from said plurality of fuel cells;
   a combustor disposed within said heater housing for combusting a mixture of a combustor fuel and a combustor oxidizing agent to form a heated combustor exhaust, said combustor having 1) a combustor fuel inlet for introducing said combustor fuel into said combustor, 2) a combustor oxidizing agent inlet for introducing said combustor oxidizing agent into said combustor, and 3) a combustor exhaust outlet for discharging said heated combustor exhaust from said combustor into said heater housing; and
   an anode exhaust conduit connected to said anode exhaust outlet and extending out of said heater housing for selectively communicating a first quantity of said anode exhaust out of said heater housing;
   whereby said heater housing is heated by said fuel cell stack assembly and said heated combustor exhaust.

2. A heater as in claim 1 wherein said cathode exhaust outlet discharges said cathode exhaust into said heater housing.

3. A heater as in claim 1 wherein said combustor fuel inlet is connected to said anode exhaust conduit for selectively supplying a second quantity of said anode exhaust to said combustor fuel inlet.

4. A heater as in claim 3 further comprising a valve in said anode exhaust conduit for adjusting said first quantity of said anode exhaust and said second quantity of said anode exhaust.

5. A heater as in claim 4 further comprising an oxidizing agent supply conduit in fluid communication with said fuel cell stack oxidizing agent inlet and said combustor oxidizing agent inlet for supplying said fuel cell oxidizing agent to said fuel cell stack assembly and for supplying said combustor oxidizing agent to said combustor.

6. A heater as in claim 3 wherein said cathode exhaust outlet discharges said cathode exhaust into said heater housing.

7. A heater as in claim 1 further comprising an oxidizing agent supply conduit in fluid communication with said fuel cell stack oxidizing agent inlet and said combustor oxidizing agent inlet to supply said fuel cell oxidizing agent to said fuel cell stack assembly and said combustor oxidizing agent to said combustor.

8. A heater as in claim 7 further comprising a fuel supply conduit in fluid communication with said fuel cell stack fuel inlet and said combustor fuel inlet to supply said fuel cell fuel to said fuel cell stack assembly and said combustor fuel to said combustor.

9. A heater as in claim 1 wherein:
said fuel cell stack assembly is one of a plurality of fuel cell stack assemblies disposed within said heater housing;
said combustor is one of a plurality of combustors disposed within said heater housing; and
said anode exhaust conduit is connected to said anode exhaust outlet of at least one of said plurality of fuel cell stack assemblies.

10. A heater as in claim 9 wherein said combustor fuel inlet of at least one of said plurality of combustors is connected to said anode exhaust conduit for selectively supplying a second quantity of said anode exhaust to each one of said plurality of combustors that is connected to said anode exhaust conduit.

11. A heater as in claim 10 further comprising a valve in said anode exhaust conduit for adjusting said first quantity of said anode exhaust and said second quantity of said anode exhaust.

12. A heater as in claim 9 wherein said combustor fuel inlet of each one of said plurality of combustors is connected to said anode exhaust conduit for selectively supplying a second quantity of said anode exhaust to each one of said plurality of combustors.

13. A heater as in claim 10 further comprising a valve in said anode exhaust conduit for adjusting said first quantity of said anode exhaust and said second quantity of said anode exhaust.

14. A heater as in claim 9 wherein said cathode exhaust outlet of each of said fuel cell stack assemblies discharges said cathode exhaust into said heater housing.

15. A method for operating a heater comprising a heater housing extending along a heater axis; a fuel cell stack assembly with a plurality of fuel cells, said fuel cell stack assembly and being disposed within said heater housing and having 1) a fuel cell stack fuel inlet for introducing a fuel cell fuel to a plurality of anodes of said plurality of fuel cells, 2) a fuel cell stack oxidizing agent inlet for introducing a fuel cell oxidizing agent to a plurality of cathodes of said plurality of fuel cells, 3) an anode exhaust outlet for discharging an anode exhaust comprising unspent fuel cell fuel from said plurality of fuel cells, and 4) a cathode exhaust outlet for discharging a cathode exhaust comprising unspent fuel cell oxidizing agent from said plurality of fuel cells; a combustor disposed within said heater housing, said combustor having 1) a combustor fuel inlet for introducing a combustor fuel into said combustor, 2) a combustor oxidizing agent inlet for introducing a combustor oxidizing agent into said combustor, and 3) a combustor exhaust outlet for discharging a heated combustor exhaust from said combustor into said heater housing; and an anode exhaust conduit connected to said anode exhaust outlet and extending out of said heater housing, said method comprising:
using said plurality of fuel cells to convert chemical energy from said fuel cell fuel into heat and electricity through a chemical reaction with said fuel cell oxidizing agent;
using said combustor to combust a mixture of said combustor fuel and said combustor oxidizing agent to form said heated combustor exhaust;
using said heat from said fuel cell stack assembly and said heated combustor exhaust to heat said heater housing; and
selectively communicating a first quantity of said anode exhaust out of said heater housing.

16. A method as in claim 15 further comprising supplying a second quantity of said anode exhaust to said combustor fuel inlet through said anode exhaust conduit.

17. A method as in claim 16 further comprising adjusting said first quantity of said anode exhaust and said second quantity of said anode exhaust.

18. A method as in claim 17 further comprising using a valve in said anode exhaust conduit to perform said step of adjusting.

19. A method as in claim 18 wherein said method further comprises modulating said valve to perform said step of adjusting.

* * * * *